US009918297B2

(12) United States Patent
Jeong

(10) Patent No.: US 9,918,297 B2
(45) Date of Patent: *Mar. 13, 2018

(54) LOCATION MEASURING METHOD AND APPARATUS USING ACCESS POINT FOR WIRELESS LOCAL AREA NETWORK SERVICE AND METHOD FOR ESTIMATING LOCATION COORDINATE OF ACCESS POINT

(71) Applicant: KT Corporation, Seeongnam (KR)

(72) Inventor: Seung-Hyuk Jeong, Seoul (KR)

(73) Assignee: KT Corporation, Seongnam (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/488,741

(22) Filed: Apr. 17, 2017

(65) Prior Publication Data

US 2017/0223656 A1  Aug. 3, 2017

Related U.S. Application Data

(63) Continuation of application No. 13/310,142, filed on Dec. 2, 2011, now Pat. No. 9,661,600.

(30) Foreign Application Priority Data

Dec. 21, 2010 (KR) ........................ 10-2010-0131606

(51) Int. Cl.
*H04W 64/00* (2009.01)
*H04W 88/10* (2009.01)
(Continued)

(52) U.S. Cl.
CPC ......... *H04W 64/003* (2013.01); *G01S 5/0242* (2013.01); *H04W 24/00* (2013.01);
(Continued)

(58) Field of Classification Search
None
See application file for complete search history.

(56) References Cited

U.S. PATENT DOCUMENTS 6,694,142 B1   2/2004 Kuwahara et al.
7,043,257 B2   5/2006 Nohara
(Continued)

FOREIGN PATENT DOCUMENTS

KR   20010067044 A   7/2001
KR   20080053116 A   6/2008
(Continued)

OTHER PUBLICATIONS

Khan et al "Distributed localization and tracking with coordinated and uncoordinated motion models" published in "47$^{th}$ Annual Allerton Conference on Communication, Control and Computing 2009" pp. 202-208 published on Oct. 2, 2009.
(Continued)

*Primary Examiner* — Andrew Lai
*Assistant Examiner* — Jamaal Henson
(74) *Attorney, Agent, or Firm* — Sughrue Mion, PLLC

(57) ABSTRACT

A method and apparatus for measuring a location of a communication terminal using an access point is provided. Information of nearby access points from the communication terminal is received. A predetermined number of nearby access points among the nearby access points is selected based on the received information. Location coordinates of the selected predetermined number of nearby access points are extracted. A barycentric coordinate is calculated using the extracted location coordinates. The calculated barycentric coordinate is determined as a final location of the communication terminal.

2 Claims, 9 Drawing Sheets

(51) Int. Cl.
*G01S 5/02* (2010.01)
*H04W 24/00* (2009.01)

(52) U.S. Cl.
CPC .............. *H04W 88/10* (2013.01); *G01S 5/02* (2013.01); *H04W 64/00* (2013.01)

(56) References Cited

U.S. PATENT DOCUMENTS

| | | | |
|---|---|---|---|
| 8,704,707 B2 | 4/2014 | Riley et al. | |
| 2005/0003822 A1 | 1/2005 | Aholainen et al. | |
| 2005/0003827 A1 | 1/2005 | Whelan | |
| 2005/0130634 A1 | 6/2005 | Godfrey | |
| 2005/0271021 A1 | 12/2005 | Alemany et al. | |
| 2006/0092890 A1 | 5/2006 | Gupta et al. | |
| 2007/0010257 A1 | 1/2007 | Capuzzello | |
| 2007/0082677 A1* | 4/2007 | Donald Hart | H04W 16/18 455/456.1 |
| 2007/0249366 A1 | 10/2007 | Thomson | |
| 2008/0080429 A1 | 4/2008 | Hart | |
| 2008/0130597 A1* | 6/2008 | Kalhan | H04W 88/10 370/338 |
| 2010/0039929 A1 | 2/2010 | Cho et al. | |
| 2010/0046406 A1* | 2/2010 | Annamalai | H04W 64/00 370/310 |
| 2010/0265092 A1 | 10/2010 | Kim et al. | |
| 2011/0235532 A1* | 9/2011 | Alizadeh-Shabdiz | G01S 5/0278 370/252 |
| 2012/0100870 A1 | 4/2012 | Prost et al. | |

FOREIGN PATENT DOCUMENTS

| | | |
|---|---|---|
| KR | 20080074971 A | 8/2008 |
| KR | 10-20080099940 A | 11/2008 |
| KR | 20090055104 A | 6/2009 |
| KR | 20100030349 A | 3/2010 |
| KR | 20110112093 A | 10/2011 |
| KR | 20110112094 A | 10/2011 |
| WO | 2007056738 A2 | 5/2007 |

OTHER PUBLICATIONS

GuoDong et al "Barycentric Location Estimation for Indoors Localization in Opportunistic Wireless Networks" published in "Second International conference on Future Generation Communication And Networking 2008"; pp. 220-225, published Dec. 15, 2008.
Non-Final Office Action dated Nov. 7, 2013 in U.S. Appl. No. 13/310,142.
Non-Final Office Action dated Jun. 25, 2014 in U.S. Appl. No. 13/310,142.
Non-Final Office Action dated Jan. 23, 2015 in U.S. Appl. No. 13/310,142.
Non-Final Office Action dated Sep. 1, 2015 in U.S. Appl. No. 13/310,142.
Non-Final Office Action dated Mar. 8, 2016 in U.S. Appl. No. 13/310,142.
Non-Final Office Action dated Jun. 30, 2016 in U.S. Appl. No. 13/310,142.
Notice of Allowance dated Jan. 17, 2017 in U.S. Appl. No. 13/310,142.

* cited by examiner

FIG. 4

| GROUP | TIME | LOCATION(LATITUDE/LONGITUDE) | MAC ADDRESS | RSSI | cell ID |
|---|---|---|---|---|---|
| 1 | AM 9.10 | 12/15 | 111.111 | -50dB | 1 |
| | | | 111.112 | -40dB | |
| | | | 111.113 | -70dB | |
| | | | 111.114 | -100dB | |
| 2 | AM 9.13 | 13/15 | 111.117 | -50dB | 1 |
| | | | 111.112 | -50dB | |
| | | | 111.118 | -70dB | |
| | | | 111.119 | -100dB | |
| 3 | AM 9.15 | 14/15 | 111.121 | -40dB | 2 |
| | | | 111.112 | -80dB | |
| | | | 111.111 | -90dB | |
| | | | 111.114 | -100dB | |
| 4 | AM 9.17 | 15/17 | 111.121 | -50dB | 1 |
| | | | 111.112 | -80dB | |
| | | | 111.127 | -70dB | |
| | | | 111.129 | -70dB | |
| ⋮ | ⋮ | ⋮ | ⋮ | ⋮ | ⋮ |
| N-1 | AM 11.11 | 20/21 | 111.113 | -60dB | 1 |
| | | | 111.112 | -40dB | |
| | | | 111.118 | -70dB | |
| | | | 111.117 | -80dB | |
| N | AM 11.13 | 30/25 | 111.131 | -50dB | 1 |
| | | | 111.122 | -40dB | |
| | | | 111.133 | -70dB | |
| | | | 111.111 | -100dB | |

LOCATION MEASURING METHOD AND APPARATUS USING ACCESS POINT FOR WIRELESS LOCAL AREA NETWORK SERVICE AND METHOD FOR ESTIMATING LOCATION COORDINATE OF ACCESS POINT

CROSS-REFERENCE TO RELATED APPLICATION

This application is a continuation of U.S. patent application Ser. No. 13/310,142, filed on Dec. 2, 2011, which claims priority under 35 U.S.C. 119(a) from Korean Patent Application No. 10-2010-0131606, filed on Dec. 21, 2010 in the Korean Intellectual Property Office, the entire disclosures of which are incorporated herein by reference in their entireties for all purposes.

BACKGROUND

1. Field

Exemplary embodiments relate to a technique for measuring a location of a communication terminal, and more particularly, to a location measuring method and apparatus using an access point for a wireless local area network (WLAN) service and a method for estimating a location coordinate of an access point.

2. Description of the Related Art

With the development of mobile communication techniques, studies have been actively made on a location measuring technique that measures a location of a mobile terminal in a communication network. Typically, a global positioning system (GPS)-based location measuring technique using satellites has been widely spread and used.

The GPS-based location measuring technique has a disadvantage of having to mount a GPS receiver on a mobile terminal. Also, because the GPS-based location measuring technique was developed by the U.S. Department of Defense for military use, a high-precision GPS-based location measuring technique is not disclosed. Furthermore, the GPS-based location measuring technique has limited use since the GPS-based location measuring technique is useless in buildings, for example, houses, offices, or shops, where satellite signals cannot be received. To overcome these drawbacks, attempts have been made to measure a location using an access point for a WLAN service.

The WLAN service enables mobile users to use the Internet wirelessly by connecting to a WLAN access point within a short-range area with user terminals, for example, notebook computers, personal digital assistants (PDAs), smart phones, and the like, that have WLAN cards mounted therein. Recently, to meet the increasing demand for the WLAN service, installation of access points in buildings, such as large-scaled shopping malls, and the like, has been increasing.

Since many access points have now been installed in buildings, by using these access points, a location of a mobile terminal can be measured in buildings where a GPS-based location measuring technique cannot be applied.

Accordingly, research and development on a location measuring technique using an access point for a WLAN service has now been flourishing.

SUMMARY

One or more exemplary embodiments relate to providing a method and apparatus for measuring a location of a communication terminal using an access point for a wireless local area network (WLAN) service, and a method for estimating a location coordinate of an access point.

Additional features will be set forth in the following description, and in part will be even more apparent from the examples set forth, or may be learned by practice of exemplary embodiments.

According to an aspect of an exemplary embodiment, there is provided a method for measuring a location of a communication terminal using an access point, the method including: storing location coordinates of access points in a storage unit; receiving information of nearby access points from the communication terminal; selecting a predetermined number of nearby access points among the nearby access points based on the received information; extracting location coordinates of the selected predetermined number of nearby access points from the storage unit and calculating a barycentric coordinate using the extracted location coordinates; and determining the calculated barycentric coordinate as a final location of the communication terminal.

The calculating may include: grouping the extracted location coordinates in a plurality of first groups and calculating barycentric coordinates of the plurality of first groups; and grouping the calculated barycentric coordinates into a plurality of second groups and calculating barycentric coordinates of the plurality of second groups in a repetitive manner to obtain one final barycentric coordinate.

The storing may include estimating an imaginary location coordinate of an access point and storing the imaginary location coordinate in the storage unit.

The storing of the imaginary location coordinates may include collecting signal strengths for location of the access point, extracting a rising point of inflection by analyzing changes in the signal strengths for location of the access point over time, and determining the imaginary location coordinate of the access point based on the extracted rising point of inflection.

The calculating may include extracting installation location coordinates for nearby access points, of which the installation location coordinates are identified, among the selected nearby access points, extracting estimated imaginary location coordinates for nearby access points, of which installation location coordinates are not identified, among the selected nearby access points, and extracting collection location coordinates for nearby access points, of which installation location coordinates and estimated imaginary location coordinates are not extracted, among the selected nearby access points.

According to an aspect of another exemplary embodiment, there is provided a method for estimating a location coordinate of an access point for near field communication, the method including: collecting signal strengths for location of an access point; extracting a rising point of inflection by analyzing changes in the signal strengths for location of the access point over time; and determining a location coordinate of the access point based on the extracted rising point of inflection.

According to an aspect of another exemplary embodiment, there is provided an apparatus for measuring a location of a communication terminal using access point information, the apparatus including: a storage unit which stores location coordinates of access points; a receiving unit which receives information of nearby access points from the communication terminal; a selecting unit which selects a predetermined number of nearby access points among the nearby access points based on the received access point information; and a calculating unit which extracts a location coordinate of each of the selected nearby access points from the storage unit, which calculates a barycentric coordinate using the extracted location coordinates, and which determines the calculated barycentric coordinate as a final location of the communication terminal.

The calculating unit may group the extracted location coordinates and calculate a barycentric coordinate of each group, and may group the calculated barycentric coordinates and calculate a barycentric coordinate of each group in a repetitive manner to obtain one final barycentric coordinate.

The apparatus may further include an imaginary location coordinate determining unit which estimates imaginary location coordinates of the access points and stores the imaginary location coordinates in the storage unit.

The apparatus may further include a collecting unit which collects the signal strength for location of the access points, and the imaginary location coordinate determining unit may extract a rising point of inflection by analyzing the changes in the signal strength for location of the access points over time, and may determine the imaginary location coordinates of the access points based on the extracted rising point of inflection.

According to an aspect of another exemplary embodiment, there is provided an apparatus for measuring a location of a communication terminal using access point information, the apparatus including: a collecting unit which collects signal strengths for location of an access point; and a calculating unit which calculates a rising point of inflection by analyzing changes in the collected signal strengths for location of the access point over time, and which determines a location coordinate of the access point based on the extracted rising point of inflection.

DESCRIPTION OF THE DRAWINGS

FIG. 4 is a table of access point information for location according to an exemplary embodiment;

Figure 1:
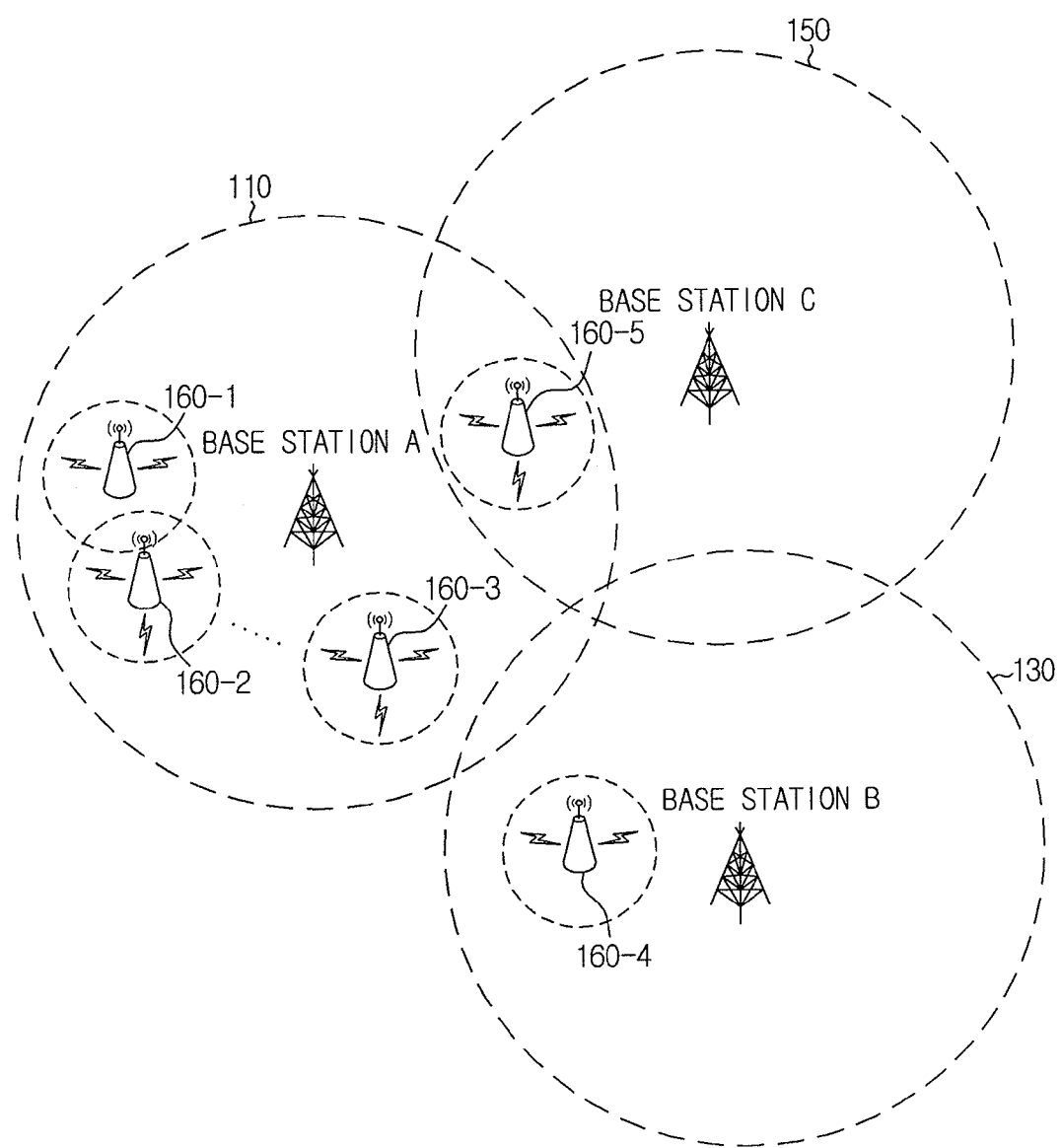
FIG. 1 is a diagram illustrating a communication environment according to an exemplary embodiment.

Throughout the drawings and the detailed descriptions, unless otherwise described, the same drawing reference numerals will be understood to refer to the same elements, features, and structures. The relative size and depiction of these elements may be exaggerated for clarity, illustration, and convenience.

DETAILED DESCRIPTION OF EXEMPLARY EMBODIMENTS

The following detailed descriptions are provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a diagram illustrating a communication environment according to an exemplary embodiment.

Referring to FIG. 1, the communication environment includes base stations (or NodeBs) that provide a mobile communication service, and access points (APs) 160-1, . . . , 160-5 that provide an Internet service using a wireless local area network (WLAN) system, for example, Wireless Fidelity (WiFi), in an overlapping arrangement. A communication terminal may use various services including voice communication and wireless Internet services via a base station when the communication terminal is mobile. Also, the communication terminal may use an Internet service by connecting to a wired Internet network via an access point.

Generally, the base station may have a coverage area of several kilometers to tens of kilometers in radius, while the access point providing a WLAN service may have a coverage area of only several meters in radius. Due to the low costs for purchasing and installing the access points, they are installed in large numbers at various places such as houses, offices, shopping malls, and the like.

As shown in FIG. 1, a plurality of access points 160-1, . . . , 160-5 are placed within the coverage areas 110, 130, and 150 of base stations. Communication terminal users use an Internet service via the access point 160-1, . . . , 160-5 at locations where a signal of the access point 160-1, . . . , 160-5 is detected. Also, where a signal of the access point 160-1, . . . , 160-5 is not detected, the communication terminal users use an Internet service via the base station.

Recently, with the advancement of smart phone functions (i.e., operations), the number of smart phone users is increasing. To provide a high-speed Internet service to smart phones, the number of access points installed is also increasing. As many access points are particularly installed in places with a large floating population, the use of the access points in location measurement is increasing. The accuracy of location measurement using an access point with a narrow coverage is higher than that of a base station with a wide coverage.

Figure 2:
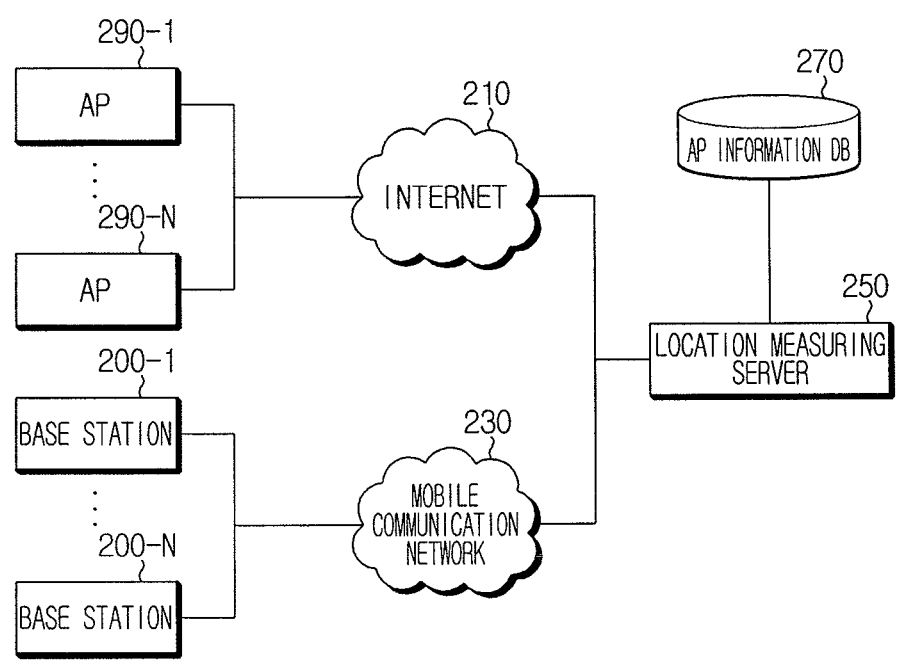
FIG. 2 is a block diagram illustrating a network structure of a location measuring system according to an exemplary embodiment.

FIG. 2 is a block diagram illustrating a network structure of a location measuring system according to an exemplary embodiment.

Referring to FIG. 2, access points 290-1, . . . , 290-N providing a WLAN service and base stations 200-1, . . . , 200-N providing a mobile communication service are provided in the network structure. As shown in FIG. 1, the coverage area of the access points 290-1, . . . , 290-N and the coverage area of the base stations 200-1, . . . , 200-N may overlap. A plurality of access points may be placed within one base station because the base station has a wider coverage area than the access point.

The access points 290-1, ..., 290-N are connected to a wired Internet network 210 to provide an Internet service. The base stations 200-1, ..., 200-N are connected to a mobile communication network 230 to provide a mobile communication service. The wired Internet network 210 and the mobile communication network 230 are linked to each other. Referring to FIG. 2, the location measuring system includes a location measuring server 250 connected to the wired Internet network 210 and the mobile communication network 230, and an access point information DB 270 managed by the location measuring server 250.

The access point information DB 270 stores identity information (for example, MAC (Media Access Control) address, SSID (Service Set IDentifier), and the like) of access points installed (i.e., located) indoors and outdoors and location coordinate information where the access points are actually installed. Also, the access point information DB 270 stores access point information for location that is collected at each location by an access point information collecting terminal while the access point information collecting terminal is mobile. The access point information for location includes collection location information collected by the access point information collecting terminal at a predetermined time cycle while the access point information collecting terminal is mobile, identity information and signal strength of access points detected at the collection locations, and identity information of base stations. A detailed description thereof will be provided below.

When the location measuring server 250 is requested to measure a location of a specific communication terminal, the location measuring server 250 measures a location of the communication terminal using identity information of a base station 200-1, ..., 200-N where the communication terminal is placed and identity information of an access point 290-1, ..., 290-N to which the communication terminal is connected. A location measuring method of the location measuring server 250 is described in detail below.

Figure 3:
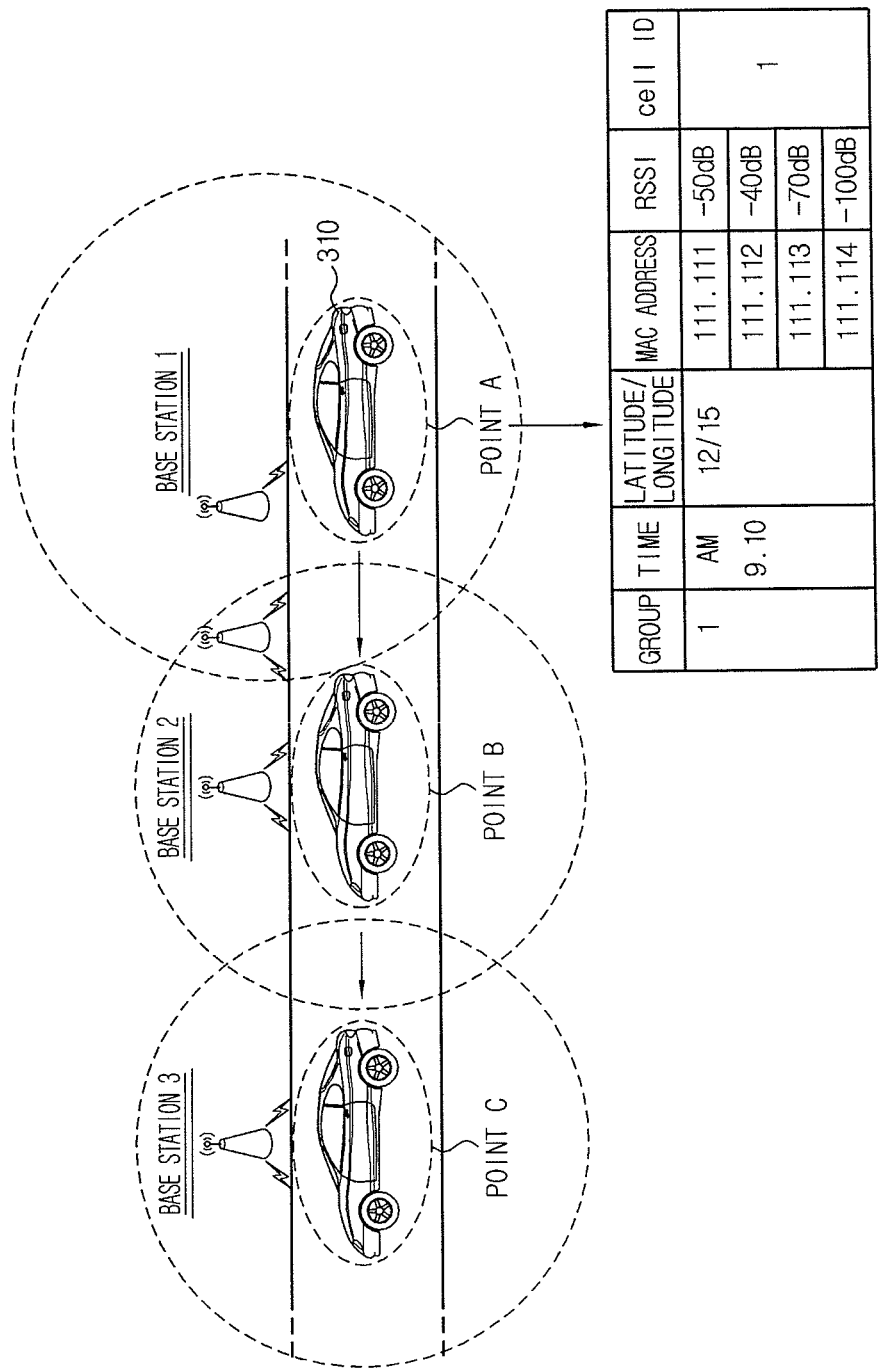
FIG. 3 is a diagram illustrating the collection of access point information for location according to an exemplary embodiment.

FIG. 3 is a diagram illustrating the collection of access point information for location according to an exemplary embodiment.

As shown in FIG. 3, an access point information collecting terminal mounted in a vehicle 310 collects information by detecting signals from nearby access points at a predetermined time cycle while the vehicle 310 is moving at low speed. The information collected by the access point information collecting terminal includes collection time, collection location information (for example, latitude and longitude), identity information (for example, MAC address) and signal strength (for example, Received Signal Strength Indication (RSSI)) of an access point which transmits a signal detected at a collection location, and identity information (for example, cell ID or Pseudo Noise (PN) code) of a base station which covers the corresponding collection location.

Referring to FIG. 3, taking point A as an example, the access point information collecting terminal mounted in the vehicle 310 collects information of an access point which transmits a signal detected at the point A. For example, the access point information collecting terminal collects latitude and longitude information of the point A, collection time, MAC address and signal strength (RSSI) of the access point which transmits the signal detected at the point A, and identity information of a base station which covers the point A. As described above, the access point information collecting terminal collects information of access points detected at every point at a predetermined time cycle (for example, every minute) while moving at a low speed.

FIG. 4 is a table of access point information for location according to an exemplary embodiment. As described above with reference to FIG. 3, the access point information collecting terminal collects information of nearby access points at a predetermined time cycle while moving, and the collected access point information for location is shown in FIG. 4. As shown in FIG. 4, the table has a time field 410, a location field 430, a MAC address field 450, an RSSI field 470, and a cell ID field 490.

The time field 410 records the time when the access point information collecting terminal collects information of an access point. The location field 430 records collection location information (e.g., latitude and longitude information). The MAC address field 450 records a MAC address of an access point detected at a collection location. The RSSI field 470 records the signal strength from an access point detected at a collection location. The cell ID field 490 records a cell ID of a base station covering a collection location. Although FIG. 4 shows only one cell ID for a base station being recorded, a plurality of cell IDs detected at the cell boundary may be recorded.

Figure 5:
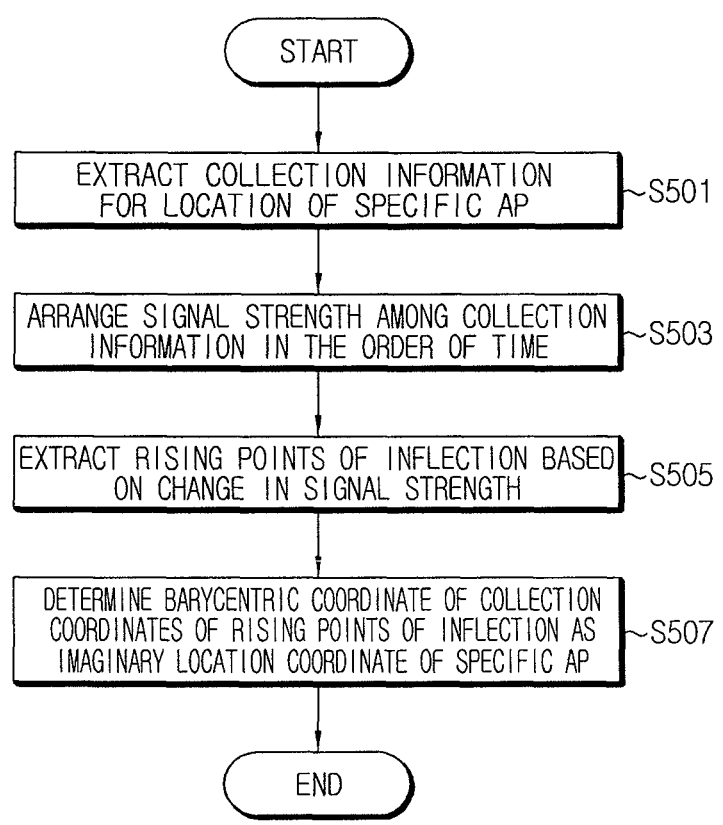
FIG. 5 is a flowchart illustrating a process for determining an imaginary location coordinate of an access point in a location measuring server according to an exemplary embodiment.

To measure a location of a communication terminal using an access point, the location measuring method according to the present exemplary embodiment utilizes installation location coordinates (actual location coordinates) of access points. Generally, the access points 160 installed all around by communication service providers have their installation location coordinates given by the communication service providers. However, a personal access point installed personally is not related to the communication service providers. Accordingly, an installation location coordinate of the personal access point may not be known unless the installation location coordinate is identified by an installer. Accordingly, there is a need to estimate an installation location coordinate of an access point, of which the installation location coordinate is not identified, among access points collected by the access point information collecting terminal while the access point information collecting terminal is mobile as described above with reference to FIG. 3. Hereinafter, described with reference to FIG. 5 is a method for estimating an installation location coordinate of an access point, of which the installation location coordinate is not identified, among the access points of which information is collected by the access point information collecting terminal while the access point information collecting terminal is mobile, according to an exemplary embodiment. That is, an estimated installation location coordinate of an access point is hereinafter referred to as an imaginary location coordinate of the access point determined based on an estimated value, and not as an actual location coordinate where the access point is actually installed.

FIG. 5 is a flowchart illustrating a process for determining an imaginary location coordinate of an access point in a location measuring server according to an exemplary embodiment.

Referring to FIG. 5, the access point information collecting terminal collects information by detecting signals from nearby access points at a predetermined time cycle while moving at low speed, as described above with reference to FIGS. 3 and 4. The access point information for location collected by the access point information collecting terminal may be transmitted to the location measuring server 250 via the Internet network 210 or the mobile communication network 230. The location measuring server 250 stores the received access point information for location in the access point information DB 270. Alternatively, the access point information for location collected by the access point information collecting terminal may be stored in the access point information DB 270 by an operator.

After the access point information for location is collected, the location measuring server 250 extracts, from the access point information DB 270, collection information for location of a specific access point, of which an installation location coordinate is not identified, among the collected access point information for location (operation S501). That is, the location measuring server 250 extracts collection information for location including information of the specific access point. For example, when a MAC address is '111.112' as shown in FIG. 4, the location measuring server 250 extracts information of Group 1, Group 2, Group 3, Group 4, and Group N−1 including MAC address '111.112'.

After the collection information for location of the specific access point is extracted as described above, the location measuring server 250 extracts the signal strength (for example, RSSI) among the collection information for location and arranges the extracted signal strength in the order of time (operation S503). For example, referring to FIG. 4, the time sequential arrangement of the signal strength of the access point having MAC address '111.112' is −40 dB, −50 dB, −80 dB, −80 dB, and −40 dB.

Figure 6:
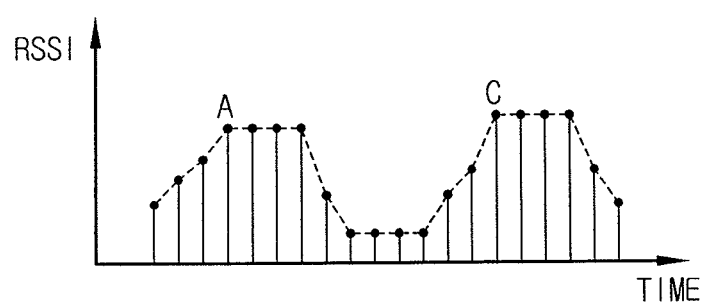
FIG. 6 is a graph illustrating an example of the extraction of a rising point of inflection based on a signal strength distribution of an access point over time according to an exemplary embodiment.

After the location measuring server 250 arranges the signal strength of the specific access point in the order of time, the location measuring server 250 extracts a rising point of inflection by analyzing the changes in the signal strength over time (operation S505). Here, the rising point of inflection is a point where the signal strength rises and reaches the highest. Specifically, FIG. 6 shows an example of the extraction of a rising point of inflection based on a signal strength distribution of an access point over time. As shown in FIG. 6, when the signal strength of the access point is arranged in the order of time, points A and C are where the signal strength rises and reaches the highest, and thus, are extracted as rising points of inflection.

After the rising points of inflection are extracted as described above, the location measuring server 250 calculates a barycentric coordinate of a polygon (or a straight line) having the apices of collection location coordinates of the rising points of inflection. The location measuring server 250 determines the calculated barycentric coordinate as an imaginary location coordinate of the specific access point, and stores the imaginary location coordinate in the access point information DB 270 (operation S507). Here, the barycentric coordinate may be replaced by the incenter, the circumcenter, and the like. Also, the barycentric coordinate may be adjusted by applying a weight to the signal strength.

In the present exemplary embodiment, the reason for using a rising point of inflection is because the rising point of inflection is a point where the signal strength of an access point is highest, and thus, is closest to a location where the access point is actually installed.

The process for determining an imaginary location coordinate of an access point as described with reference to FIG. 5 is performed on all access points, of which installation location coordinates are not identified, among the access points collected by the access point information collecting terminal while the access point information collecting terminal is mobile.

Figure 7:
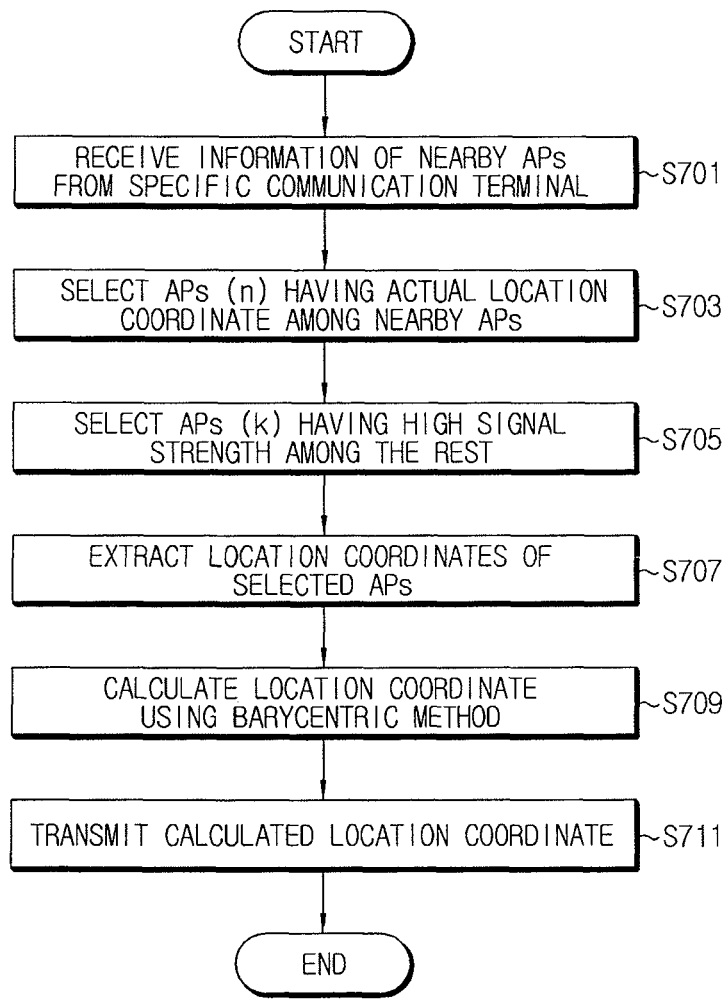
FIG. 7 is a flowchart illustrating a process for measuring a location of a communication terminal in a location measuring server according to an exemplary embodiment.

FIG. 7 is a flowchart illustrating a process for measuring a location of a communication terminal in the location measuring server 250 according to an exemplary embodiment.

Referring to FIG. 7, the location measuring server 250 receives a location measurement request for a specific communication terminal to be measured for its location. The location measuring server 250 receives identity information (for example, MAC address or SSID) and signal strength information of a nearby access point from the specific communication terminal (operation S701).

The location measuring server 250 controls the specific communication terminal to transmit the information (for example, identity information and signal strength information) of the nearby access point using identity information of the specific communication terminal. The specific communication terminal may transmit information (for example, identity information and signal strength) of a plurality of nearby access points.

Next, the location measuring server 250 selects access points having an actual location coordinate among the nearby access points of which information is received from the specific communication terminal (operation S703). That is, the location measuring server 250 checks whether there is an access point having an actual location coordinate stored in the access point information DB 270, using identity information (for example, MAC address) of the nearby access points. In the present example, it is assumed that the number of the selected access points is 'n'.

In this instance, when there is no access point having an actual location coordinate, an access point is not selected in this operation. When selecting an access point having an actual location coordinate, only an access point having a predetermined signal strength or higher may be selected. A low signal strength may be interpreted as being located at a distance away from the communication terminal, and accordingly, an access point having a low signal is not selected even though its actual location coordinate exists.

Next, the location measuring server 250 selects the top k access points based on the signal strength among access points excluding access points having an actual location coordinate (operation S705). For example, when there are six access points having an actual location coordinate among thirty access points of which information is received from the specific communication terminal, the location measuring server 250 selects the top k access points having a high signal strength based on signal strength among the twenty four access points not having actual location coordinates.

Here, R=(k+n) may be $L^i$ where L is a natural number of 3 or more and i is a natural number of 2 or more. When the number n of access points having an actual location coordinate is R in operation S703, this operation S705 may be omitted.

Next, the location measuring server 250 extracts location coordinates of the selected R access points from the access point information DB 270 (operation S707).

Specifically, for access points having an actual location coordinate, the location measuring server 250 extracts their actual location coordinates from the access point information DB 270.

For access points not having an actual location coordinate, the location measuring server 250 checks whether their imaginary location coordinates are stored in the access point information DB 270, and if so, extracts the imaginary location coordinates from the access point information DB 270.

For access points not having an actual location coordinate and an imaginary location coordinate, the location measuring server 250 extracts collection location coordinates of the top i (where i is the number of access points) access points having a high signal strength from the access point information DB 270 based on signal strength for location of the corresponding access points detected at each collection location, as location coordinates of the corresponding access points.

For example, when there are three access points A, B, and C not having an actual location coordinate and an imaginary location coordinate in which the signal strength for location of access point A is −40 dB and −50 dB, that of access point B is −50 dB, −60 dB, and −70 dB, and that of access point C is −60 dB and −100 dB, the top three signal strengths are −40 dB and −50 dB of the access point A and −50 dB of the access point B. The location measuring server 250 extracts collection location coordinates where −40 dB and −50 dB of the access point A and −50 dB of the access point B are collected, as location coordinates of the corresponding access points.

After the location coordinates of the access points selected in operations S703 and S705 are extracted as described above, the location measuring server 250 calculates a final location coordinate using the extracted location coordinates by the barycentric method (operation S709). Also, the location measuring server 250 transmits the final location coordinate to an object that has requested location measurement (for example, a communication terminal, a web server, and the like) (operation S711). The determined final location coordinate may be provided in the form of a map, or may be provided by transforming into an address corresponding to the coordinate. However, it is understood that the form of the location information to be provided is not limited thereto.

The calculating of the location coordinate using the barycentric method in operation S709 according to an exemplary embodiment is described in detail with reference to FIG. 8.

Figure 8:
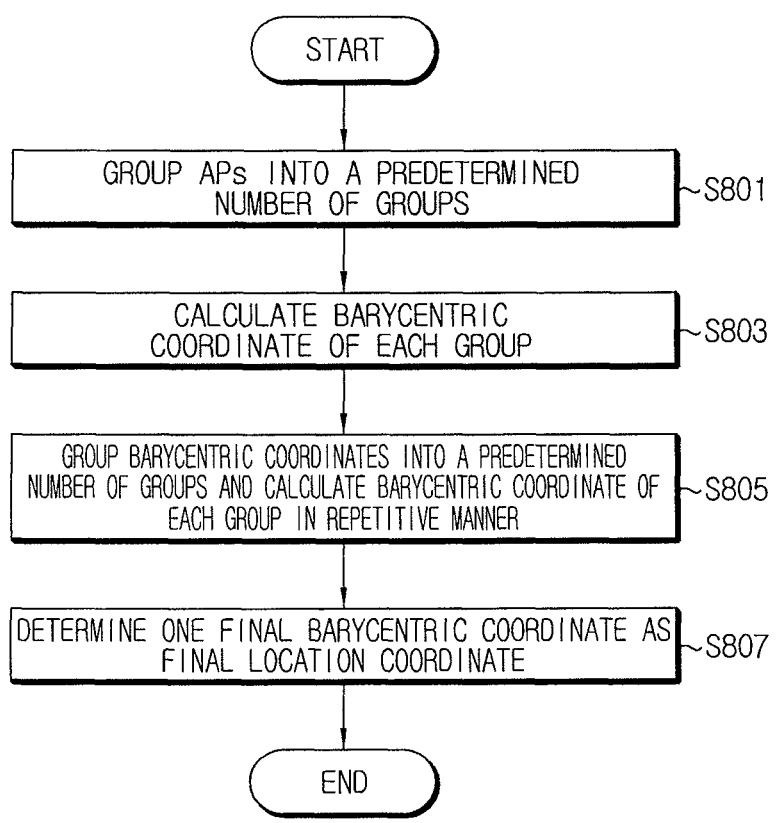
FIG. 8 is a flowchart illustrating a process for calculating a location coordinate using the barycentric method according to an exemplary embodiment.

FIG. 8 is a flowchart illustrating a process for calculating a location coordinate using the barycentric method according to an exemplary embodiment.

As shown in FIG. 8, the location measuring server 250 groups the access points extracted in operation S707 of FIG. 7 into a predetermined number of groups, in which M (where M is a natural number of 3 or more, and may be equal to L) access points are randomly selected in each group (operation S801), and calculates a barycentric coordinate of each group using location coordinates of access points in each group (operation S803).

Figure 9:
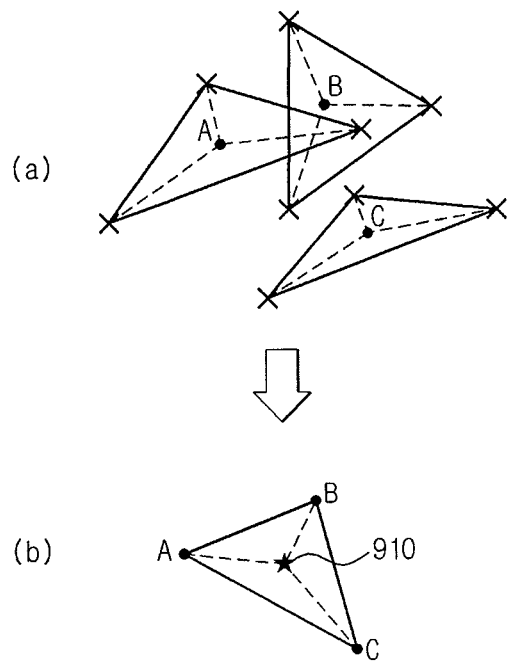
FIG. 9 is a diagram illustrating the calculation of a location coordinate of a communication terminal according to an exemplary embodiment.

A detailed description of calculating a barycentric coordinate will now be provided with reference to FIG. 9. FIG. 9 is a diagram illustrating the calculation of a barycentric coordinate according to an exemplary embodiment. In the exemplary embodiment described with reference to FIG. 7, R is 9 and M is 3. In operation S707, when nine access points are selected, the selected nine access points are grouped into three groups, in which three access points are randomly selected in each group. As shown in (a) of FIG. 9, a barycentric coordinate of a triangle is calculated, the triangle having location coordinates (actual location coordinates or imaginary location coordinates) of three access points in each group as the apices. In (a) of FIG. 9, 'A', 'B', and 'C' are each a barycentric coordinate of a respective group.

Access points having an actual location coordinate may be equally distributed to each group. For example, when there are three access points having an actual location coordinate, one access point having an actual location coordinate is included in each group. This is to reduce an error in location measurement by including an actual location coordinate in each group because the actual location coordinate is a precise location coordinate.

Next, after the barycentric coordinates are calculated as described above, the location measuring server 250 groups the calculated barycentric coordinates into a predetermined number of groups, in which M barycentric coordinates are randomly selected in each group, and re-calculates a barycentric coordinate of each group. This process is repeated until one barycentric coordinate is obtained (operation S805).

Specifically, in (a) of FIG. 9, the calculated barycentric coordinates are 'A', 'B', and 'C'. Because three barycentric coordinates are sufficient to form a group, further grouping is not necessary. When a barycentric coordinate of a triangle having the three barycentric coordinates as the apices is calculated, one final barycentric coordinate 710 is obtained as shown in (b) of FIG. 9.

Finally, the location measuring server 250 determines one final barycentric coordinate 710 obtained by the barycentric method as a final location of the specific communication terminal (operation S807).

The present exemplary embodiment is described based on that R is $L^i$. This is because a polygon (for example, a triangle) of the same pattern is used to calculate a barycentric coordinate in operations S803 and S805 when M is set to equal L. However, it is understood that R need not equal $L^i$ according to one or more other exemplary embodiments. In operations S803 and S805 for calculating a barycentric coordinate by grouping, when a number X (where M<X<2× M) of barycentric coordinates remain at the end, a final barycentric coordinate may be calculated by forming a polygon having the number X (where M<X<2×M) of barycentric coordinates as the apices. Alternatively, a final barycentric coordinate may be calculated by grouping the number of barycentric coordinates into a predetermined number of groups, in which the number of barycentric coordinates in each group may not be equal.

The exemplary embodiment described with reference to FIGS. 7 and 8 is described based on nine or more nearby access points. However, in the case of two or three nearby access points, a barycentric coordinate of the two or three access points is determined as a final location coordinate of the communication terminal. In the case of four nearby access points, a barycentric coordinate of three access points among the four access points is calculated first, then a barycentric coordinate of the calculated barycentric coordinate and a location coordinate of the other one access point is calculated and determined as a final location coordinate of the communication terminal. As described above, when there are nine or less nearby access points, proper grouping of the access points and calculating of a barycentric coordinate may be performed to obtain a final one location coordinate.

Figure 10:
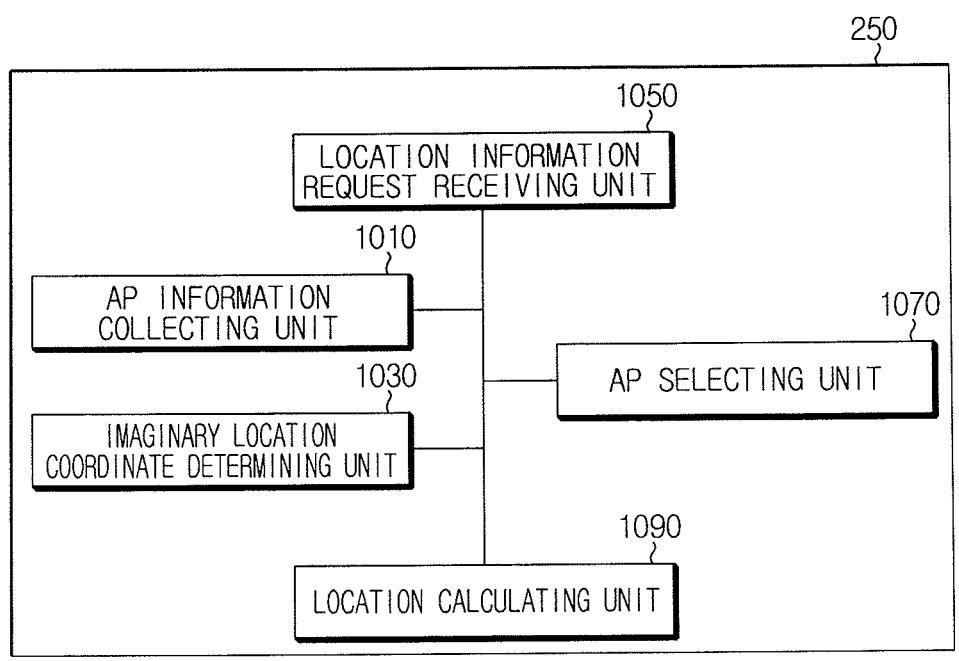
FIG. 10 is a block diagram illustrating a structure of a location measuring server according to an exemplary embodiment.

FIG. 10 is a block diagram illustrating a structure of the location measuring server 250 according to an exemplary embodiment.

Referring to FIG. 10, the location measuring server 250 according to an exemplary embodiment includes an access point information collecting unit 1010, an imaginary location coordinate determining unit 1030, a location information request receiving unit 1050, an access point selecting unit 1070, and a location calculating unit 1090.

The access point information collecting unit 1010 receives access point information for location collected by the access point information collecting terminal at a predetermined time cycle, and stores the access point information for location in the access point information DB 270. The access point information collecting unit 1010 may directly receive access point information for location from the access point information collecting terminal via the Internet network 210 or the mobile communication network 230. An example of the access point information for location is shown in FIG. 4.

The imaginary location coordinate determining unit 1030 estimates and determines installation location coordinates of access points not having installation location coordinates based on the access point information for location collected by the access point information collecting unit 1010. The location coordinate estimated and determined by the imaginary location coordinate determining unit 1030 is referred to as an imaginary location coordinate.

Specifically, the imaginary location coordinate determining unit 1030 extracts, from the access point information DB 270, collection information for location of a specific access point, of which an installation location coordinate is not identified, among the collected access points. Also, after the imaginary location coordinate determining unit 1030 extracts the collection information for location of the specific access point, the imaginary location coordinate determining unit 1030 extracts the signal strength (for example, RSSI) among the collection information for location, arranges the extracted signal strength in the order of time, and analyzes the changes in the signal strength over time to extract a rising point of inflection. Here, the rising point of inflection is a point where the signal strength rises and reaches a highest level.

FIG. 6 is an example illustrating the extraction of a rising point of inflection based on a signal strength distribution of an access point over time. As shown in FIG. 6, when the signal strength of the access point is arranged in the order of time, points A and C are where the signal strength rises and reaches the highest, and thus, are extracted as rising points of inflection.

When the rising points of inflection are extracted, the imaginary location coordinate determining unit 1030 calculates a barycentric coordinate of collection location coordinates of the rising points of inflection, that is, collection location coordinates where the signal strength of the rising points of inflection is collected. Also, the imaginary location coordinate determining unit 1030 determines the calculated barycentric coordinate as an imaginary location coordinate of the specific access point, and stores the imaginary location coordinate in the access point information DB 270. Here, the barycentric coordinate may be replaced by the incenter, the circumcenter, and the like.

Accordingly, an actual location coordinate or an imaginary location coordinate of each access point is stored in the access point information DB 270.

The location information request receiving unit 1050 receives a location measurement request for a specific communication terminal. The location measurement request may be received from another communication network equipment by the request of another communication terminal. When the location information request receiving unit 1050 receives the location measurement request, the location information request receiving unit 1050 controls the specific communication terminal so as to receive identity information (for example, MAC address or SSID) and signal strength of nearby access points from the specific communication terminal.

The access point selecting unit 1070 selects R access points among the nearby access points of which information is received by the location information request receiving unit 1050. Here, R may be $L^i$ where L is a natural number of 3 or more and i is a natural number of 2 or more.

When selecting R access points, the access point selecting unit 1070 selects access points having an actual location coordinate by referring to the access point information DB 270, and selects the other access points having a high signal strength.

Accordingly, when there are R access points having an actual location coordinate, only access points having an actual location coordinate are selected, and if insufficient, access points having a high signal strength (where the signal strength is a value measured and reported by the specific communication terminal) are selected. In this instance, when selecting access points having an actual location coordinate, only access points having a predetermined signal strength or higher may be selected. Here, the signal strength is that of the nearby access points received from the specific communication terminal.

The location calculating unit 1090 extracts location coordinates of the access points selected by the access point selecting unit 1070 from the access point information DB 270, and calculates a final one location coordinate using the extracted location coordinates by the barycentric method.

Specifically, for access points having an actual location coordinate, the location calculating unit 1090 extracts their actual location coordinates from the access point information DB 270.

For access points not having an actual location coordinate, the location calculating unit 1090 checks whether their imaginary location coordinates are stored in the access point information DB 270, and if so, extracts the imaginary location coordinates from the access point information DB 270.

For access points not having an actual location coordinate and an imaginary location coordinate, the location calculating unit 1090 extracts collection location coordinates of the top i (where i is the number of access points) access points having a high signal strength based on signal strength for location of the corresponding access points detected at each collection location, as location coordinates of the corresponding access points.

For example, when there are three access points A, B, and C not having an actual location coordinate and an imaginary location coordinate, in which the signal strength for location of access point A is −40 dB and −50 dB, that of access point B is −50 dB, −60 dB, and −70 dB, and that of access point C is −60 dB and −100 dB, the top three signal strengths are −40 dB and −50 dB of the access point A and −50 dB of the access point B. The location calculating unit 1090 extracts collection location coordinates where −40 dB and −50 dB of the access point A and −50 dB of the access point B are collected, as location coordinates of the access points not having an actual location coordinate and an imaginary location coordinate.

The location calculating unit 1090 groups the access points selected by the access point selecting unit 1070 into a predetermined number of groups, in which M (where M is a natural number of 3 or more, and may be equal to L) access points are randomly selected in each group, and calculates a barycentric coordinate of each group using the extracted location coordinates of the access points. In this instance, the location calculating unit 1090 equally distributes the access points having an actual location coordinate to each group.

Also, the location calculating unit 1090 groups the calculated barycentric coordinates into a predetermined number of groups, in which M barycentric coordinates are randomly selected in each group, and re-calculates a barycentric coordinate of each group. The location calculating unit 1090 repeats this process until one barycentric coordinate is obtained, and determines the obtained one barycentric coordinate as a final location of the specific communication terminal.

When the location calculating unit 1090 calculates a barycentric coordinate based by grouping, if a number X (where M<X<2×M) of barycentric coordinates remain at the end, the location calculating unit 1090 may calculate one final barycentric coordinate by forming a polygon having the number X (where M<X<2×M) of barycentric coordinates as the apices.

Alternatively, the location calculating unit 1090 may calculate one final barycentric coordinate by grouping barycentric coordinates into a predetermined number of groups, in which the number of barycentric coordinates in each group is not equal.

The final coordinate calculated by the location calculating unit 1090 is transmitted to an object that have requested location measurement.

The access point described in the present exemplary embodiment may be a micro base station, a pico base station, a UbiCell base station, and the like, depending on the policies of the manufacturers or communication providers. Accordingly, it should be understood that the access point of the present exemplary embodiment is a gateway point capable of providing an Internet service to a communication terminal through a common Internet line by directly communicating with the communication terminal via local area communications.

Also, it is obvious that the location measuring method of exemplary embodiments may be applied indoors as well as outdoors. In this instance, while a latitude and longitude coordinate may be used as a collection location coordinate outdoors, an imaginary location coordinate may be used as a collection location coordinate indoors. For example, the location measuring method of an exemplary embodiment may measure a location of a communication terminal using the barycentric method by setting imaginary location coordinates on each floor of a building classified by coordinates and collecting information of access points at each coordinate.

Also, the location measuring method of exemplary embodiments may be applied to a child location monitoring service, a location tracking service of a vehicle parked indoors or outdoors, a customized ad service based on a location of a communication terminal, a criminal protective supervision service, and the like.

A method of one or more exemplary embodiments may be recorded in non-transitory computer-readable media (CD ROM, random access memory (RAM), read-only memory (ROM), floppy disks, hard disks, magneto-optical disks, and the like) including program instructions to implement various operations embodied by a computer. Moreover, one or more units of the access point 290, the communication terminals, the location measuring server 250, etc., can include a processor or microprocessor executing a computer program stored in a computer-readable medium.

While this specification contains many features, the features should not be construed as limitations on the scope of the disclosure or of the appended claims. Certain features described in the context of separate exemplary embodiments can also be implemented in combination. Conversely, various features described in the context of a single exemplary embodiment can also be implemented in multiple exemplary embodiments separately or in any suitable subcombination.

Although the drawings describe the operations in a specific order, one should not interpret that the operations are performed in a specific order as shown in the drawings or successively performed in a continuous order, or all the operations are performed to obtain a desired result. Multitasking or parallel processing may be advantageous under any environment. Also, it should be understood that all exemplary embodiments do not require the distinction of various system components made in this description. The program components and system may be generally implemented as a single software product or multiple software product packages.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for measuring a location of a communication terminal by an access point, the method comprising:
    receiving, by the access point, information of nearby access points obtained by the communication terminal;
    selecting, by the access point, a predetermined number of nearby access points among the nearby access points based on the received information, the selected predetermined number of nearby access points including access points with actual location coordinates and remaining access points, other than the access points with actual location coordinates, having signal strength above a threshold;
    extracting, by the access point, location coordinates of the selected predetermined number of nearby access points from a data storage;
    calculating, by the access point, a barycentric coordinate using the extracted location coordinates; and
    determining, by the access point, the calculated barycentric coordinate as a final location of the communication terminal.

2. An apparatus configured to measure a location of a communication terminal using access point information, the apparatus comprising:
    a data storage configured to store location coordinates of access points;
    a receiver configured to receive information of nearby access points obtained by the communication terminal; and
    a processor configured to select a predetermined number of nearby access points among the nearby access points based on the received information, the selected predetermined number of nearby access points including access points with actual location coordinates and remaining access points, other than the access points with actual location coordinates, having signal strength above a threshold, and configured to extract location coordinates of the selected predetermined number of nearby access points from the data storage, to calculate a barycentric coordinate using the extracted location coordinates, and to determine the calculated barycentric coordinate as a final location of the communication terminal.

* * * * *